United States Patent Office 3,071,620
Patented Jan. 1, 1963

3,071,620
MANUFACTURE OF AROMATIC
HYDROXYALDEHYDES
Werner Müller and Wilhelm Möllering, both of Koln, and Werner Schommer, Leverkusen-Bayerwerk, Germany, assignors to Farbenfabriken Bayer Aktiengesellschaft, Leverkusen, Germany, a corporation of Germany
No Drawing. Filed Jan. 26, 1959, Ser. No. 788,794
Claims priority, application Germany Aug. 27, 1953
2 Claims. (Cl. 260—600)

This invention relates to a process for the production of aromatic hydroxyaldehydes.

It is known that for example halogenated aromatic compounds or aromatic compounds containing sulfonic acid groups can be converted into the corresponding hydroxy compounds by alkali fusion or alkaline hydrolysis in an aqueous medium at high temperatures and pressures. It is further known that this hydrolysis can be assisted by negative substituents, such as nitro groups, sulfonic acid groups, carboxylic acid groups, or carbonyl groups standing in o- or p-position, so that the conversion occurs at lower temperatures. The application of this method to the correspondingly substituted aldehydes has not been successful until now because the very reactive aldehyde group enters in this case into other undesirable reactions. Thus O. Graebe and H. Kraft, "Berichte der deutschen chemischen Gesellschaft" 39, II, page 2511, found that the potassium hydroxide melt of o-formylbenzenesulfonic acid essentially results in oxidation, so that the final products are carboxylic acids. On the other hand, aqueous alkali disproportionates the aldehydes in the manner of Cannizzaro's reaction. Apart from this, more or less highly condensed resinous reaction products are obtained at higher temperatures. Aromatic hydroxyaldehydes, such as salicylaldehyde or 2-hydroxy-1-naphthaldehyde, have therefore been produced up to now according to the known method of Reimer-Tiemann or according to German Patent No. 514,415, the greatest disadvantages of which for industrial use are the difficult working up and the inadequate yields.

It has now been found that halogen atoms and sulfonic acid groups attached to aromatic aldehydes in o- and/or p-position to the aldehyde group may be converted to hydroxy groups without any change of the aldehyde group by subjecting the aromatic aldehyde carrying said halogen atoms and/or sulfonic acid groups for 1 to 10 minutes in an aqueous alkaline medium to a temperature within the range of 220° to 300° C., care being taken that the reaction mixture is immediately cooled thereafter.

The hydrolysis takes place almost instantaneously when the aldehyde component is reacted with the aqueous alkali at a temperature of about 220 to 300° C. in accordance with the invention, and there are obtained hydroxyaldehydes which are substantially free from undesirable by-products, on the one hand, while on the other hand it is possible to carry out the process discontinuously as well as continuously. When the process is carried out in a continuous manner, the reaction mixture withdrawn is replaced by a corresponding amount of the reaction components.

The alkali concentration may vary within wide limits. It may be advisable to add to the reaction mixture a catalyst, such as copper, cobalt, nickel, or compounds thereof, which sometimes act beneficially. However, in general, catalysts may be dispensed with.

Emulsifiers, wetting agents and other surface active agents may be added in those cases in which the starting material is insoluble or only poorly soluble in the reaction mixture.

The reaction time is chosen preferably in such a manner that by using the higher reaction temperatures, e.g. 270 to 300° C. only short reaction times such as 1 to 3 minutes are applied while at the lower reaction temperature longer reaction times, that means up to 10 minutes, are used. If the aromatic aldehydes contain more than one halogen or sulfonic acid group in the o- and/or p-position to the aldehyde group, there is hydrolyzed in most cases mainly one halogen or sulfonic acid group if the shorter reaction times are applied while at the longer reaction times often the second halogen or sulfonic acid group is hydrolyzed as well. The most suitable reaction times and temperatures can be easily determined by tests. It is very important that the heating is not carried out for to long a period of time, since otherwise undesired by-products are produced in larger amounts. Therefore, the reaction components are preferably preheated at least partly to the reaction temperature before the components are reacted. For the same reason the reaction mixture is cooled immediately after carrying through the treatment of the invention to temperatures below about 150° C.

It was very surprising that the process of the invention could be carried out in the indicated manner, since the hydrolysis does not take place at temperatures below about 220 C. to a practical useful extent and since otherwise at higher temperatures and applying longer reaction times than indicated in this invention undesired by-products are formed in larger amounts.

This process is particularly suited for the preparation of the industrially important salicylaldehyde and its substitution products, for which the cheapest starting materials are o-chlorobenzaldehyde and benzaldehyde-o-sulfonic acid or their substitution products. The aromatic aldehydes used may be furthermore substituted for example by amino- and substituted amino groups, such as lower alkyl-substituted amino groups.

The new method can thus be generally employed and makes possible, apart from the improved production of known hydroxyaldehydes, the production of new and very valuable hydroxyaldehydes, which are important as intermediate products for dyestuffs, insecticides, additives for lubricants, polymers and the like.

Without any claim to being exhaustive the following aldehydes suitable for the process may be mentioned by way of example: The isomeric halogen- or sulfonic acid-, benzaldehydes, 4 - chlorobenzaldehyde - 2 - sulfonic acid, 4-aminobenzaldehyde-2-sulfonic acid, 4-dimethylaminobenzaldehyde-2-sulfonic acid, 4-diethylaminobenzaldehyde-2-sulfonic acid, 2,4-dichlorobenzaldehyde, 2,6-dichlorobenzaldehyde, trichlorobenzaldehyde and naphthaldehyde sulfonic acids.

Suitable alkalies are for example the hydroxides, oxides, carbonates and bicarbonates of alkali metals and alkaline earth metals, ammonia, ethylenediamine and the like.

The invention is further illustrated by the following examples without being restricted thereto.

This application is a continuation-in-part patent application to our application Serial No. 450,778, filed August 18, 1954, now abandoned.

Example 1

Into 700 parts by weight of a 6% sodium carbonate solution preheated to 250° C. there are injected 40 parts by weight of o-chlorobenzaldehyde in the form of 270 parts by weight of a 15% aqueous emulsion within 2 minutes while the temperature is kept at 250° C. The emulsion is prepared by vigorous stirring of a mixture of 84 parts by weight of water, 15 parts by weight of o-chlorobenzaldehyde and 1 part by weight of sodium hexadecanesulfamido acetate ($C_{16}H_{33}SO_2NHCH_2COONa$). The hydrolysis is completed at 250° C. after 5 minutes. The solution is thereafter immediately cooled to 100° C. and the pressure reduced. The unreacted o-chlorobenzaldehyde is driven off from the alkaline solution by steam distillation. The remaining aqueous solution of the salicylaldehyde-sodium salt is rendered distinctly acid with sulfuric acid and the free salicylaldehyde is driven off by renewed steam distillation and distilled. The conversion of the o-chlorobenzaldehyde into salicylaldehyde is nearly quantitative. The unreacted o-chlorobenzaldehyde may be re-used directly in the hydrolysis.

If instead of o-chlorobenzaldehyde, another o-substituted halogeno-benzaldehyde, for example o-bromobenzaldehyde, is treated in the above manner, salicylaldehyde is obtained in an equaly good yield.

Example 2

In a manner similar to that of Example 1, p-hydroxybenzaldehyde may be produced from p-chlorobenzaldehyde. The procedure corresponds to that of Example 1 with regard to the proportion and the carrying out of the method. After acidulation of the solution, freed from unreacted p-chlorobenzaldehyde, the p-hydroxy-benzaldehyde formed is shaken out with ether, the ether is evaporated and the partly crystallized residue is recrystallized from water.

Example 3

Into 700 parts by weight of a 6% potassium hydroxide solution preheated to 220° C. there are pumped within 2 minutes 300 parts by weight of 20% aqueous solution of the sodium salt of benzaldehyde-o-sulfonic acid while the temperature is kept at 260° C., and after a reaction time of 10 minutes the product is blown out by way of an ascending tube with connected condenser. The clear solution is rendered acid with sulfuric acid, the salicylaldehyde formed is separated by steam distillation, and purified by distillation as usual, yield 79%.

Instead of the benzaldehyde-o-sulfonic acid there can be used also the benzaldehyde-p-sulfonic acid.

By carrying out the reaction at 300° C. the heating is carried out only for 2½ minutes.

Example 4

The hydrolysis of benzaldehyde-o-sulfonic acid described in Example 3 is carried out in a continuous manner by proceeding with solutions proportioned according to Example 3 as follows:

The alkali solution is heated to 260° C. in a pressure tube. Subsequently, the preheated aqueous solution of the sodium salt of benzaldehyde-o-sulfonic acid is injected into the alkaline medium. The dimensions of the reaction tube are arranged to be such that the solution remains in the tube for 3 minutes before the pressure is reduced and the reaction solution is cooled to 100° C. The amounts of reaction solution withdrawn from the tube are replaced by appropriate amounts of the starting solutions by continuous pumping, so that the pressure in the pressure part of the apparatus, which corresponds to the vapor pressure of water at the reaction temperature of 260° C., is maintained. The separation of the salicylaldehyde formed is effected after acidulation of the solution according to Example 3.

Example 5

Into 700 parts by weight of a 23.6% potassium carbonate solution, which is heated to 260° C. in a pressure vessel, 300 parts by weight of a 20% 4-chlorobenzaldehyde-2-sulfonic acid solution are injected within 2 minutes while the temperature is kept at 260° C., and blown out after a reaction time of 1 minute by way of an ascending tube with connected condenser. The deep red solution, after acidulation with sulfuric acid, is subjected to steam distillation. The readily volatile, hitherto unknown 4-chloro-salicylaldehyde separates in the distillate as a clear oil which solidifies on cooling with ice. It is re-dissolved from a small amount of petroleum ether or ligroin and melts at 49° C. It crystallizes in colorless long needles; it is sparingly soluble in water, readily soluble in ligroin and very readily soluble in all other organic solvents. It forms an oxime which melts at 138 to 140° C.; it yields with ethylenediamine as a 2:1 adduct a yellow colored azomethine, melting point 201° to 202° C.; with aniline a yellow colored azomethine, melting point 113° to 115° C. The alkali metal salts of 4-chlorosalicylaldehyde are light yellow. It turns reddish violet in aqueous ferric chloride.

The solution freed from the 4-chloro-salicylaldehyde is filtered off from resinous by-products, which evidently constitute condensation products of 2,4-dihydroxybenzaldehyde formed as a by-product, and concentrated. In the residual salt there is contained, besides unconverted 4-chlorobenzaldehyde-2-sulfonic acid, the 4-hydroxybenzaldehyde-2-sulfonic acid.

Example 6

An emulsion of 30 parts by weight of 2,4-dichlorobenzaldehyde in 270 parts by weight of water, heated to 80° C., is injected within 2 minutes into 700 parts by weight of a 13.5% potassium carbonate solution which has been previously heated to 220° C. in a pressure vessel. Immediately after the injection the solution which had a temperature of about 220° C. is cooled and the pressure reduced. Portions of unconverted 2,4-dichlorobenzaldehyde are driven off from the alkaline solution by steam. The remaining solution is thereupon acidulated with sulfuric acid and again subjected to steam distillation. The readily volatile 4-chloro-salicylaldehyde, melting point 49° C., separates in the distillate and is isolated as described in Example 5.

The solution freed from the 4-chloro-salicylaldehyde is filtered off from resinous by-products and evaporated to dryness. The dry residue is twice extracted with a total of 150 ml. of ether, the ethereal solution is treated with an equal volume of ligroin and concentrated to two-thirds of the original volume. On cooling, the 2-chloro-4-hydroxybenzaldehyde separates in rough crystalline lumps. It forms, when recrystallized from benzene, colorless needles, melting point 144° to 145° C. The substance is sparingly soluble in ligroin and in petroleum ether, soluble in water and in benzene and readily soluble in alcohol, ether, acetone and acetic acid. The alkali metal salts are colorless; with ferric chloride in water a brown color results. The aldehyde forms with aniline a yellow azomethine, melting point 224° to 225° C.; the corresponding semicarbazone melts at 204° to 205° C.

On concentrating the mother liquor of 2-chloro-4-hydroxybenzaldehyde a small amount of 2,4-dihydroxybenzaldehyde separates along with the residual 2-chloro-4-hydroxybenzaldehyde and may be isolated from the latter in the form of a poorly soluble residue by digesting in a sufficient quantity of cold benzene. Melting point: 134° C.

Corresponding results are obtained if instead of the 2,4-dichlorobenzaldehyde there is used benzaldehyde-2,4-disulfonic acid. Furthermore there can be used 2,6-dichlorobenzaldehyde.

Example 7

700 parts by weight of a 8.5% potassium hydroxide solution are heated to 260° C. in an autoclave. 300 parts by weight of a 5.8% aqueous solution of 2-formyl-5-amino-benzenesulfonic acid are pumped into the solution within 2 minutes while the temperature of the mixture is kept at 260° C. After a reaction time of 3 minutes the product is discharged via a condenser. Upon addition of sulfonic acid, 4-amino-2-oxybenzaldehyde is precipitated from the brown colored solution in fire-red flakes, the amount of which increases at the neutral point. The precipitate is filtered off and dried. The polymeric aldehyde thus obtained is a red or brown amorphous powder that is insoluble in organic solvents. It dissolves in concentrated acids with red color and in alkalies with red brown color.

One portion of the polymeric 4-amino-2-oxybenzaldehyde is dissolved in concentrated hydrochloric acid, diazotized at a temperature of 0° to 5° C. and then heated in the presence of cuprous chloride. The 4-chloro-salicyl-aldehyde formed is separated by steam distillation in the form of an oil which solidifies on cooling with ice. It may be recrystallized from ligroin; melting point 49° C.

Another portion of the polymeric 4-amino-2-oxy-benzaldehyde is diazotized in sulfuric acid solution and then heated. The resorcinylaldehyde formed is extracted with ether from the solution, the ether solution dried and treated with activated carbon. Upon addition of ligroin the solution is concentrated. The resorcinylaldehyde crystallizes in golden yellow crystals, melting at 133° to 134° C.

*Example 8*

700 parts by weight of a 5.3% sodium hydroxide solution are heated to 280° C. in an autoclave. 300 parts by weight of 6% aqueous solution of 2-formyl-5-diethyl-amino-benzene-sulfonic acid are pumped into the solution within 2 minutes while the temperature of the mixture is kept at 280° C. After a reaction time of 1 minute the product is discharged via a condenser. The reaction mixture is cooled and the deep red colored solution neutralized with hydrochloric acid. The p-diethylamino-salicylaldehyde separates in the form of a brown oil which solidifies on cooling.

The aldehyde is purified by extraction with ether from the neutralized reaction mixture, treated, if necessary, with activated carbon and recovered from the cold concentrated solution by addition of petroleum ether in slightly brown colored crystals, melting at 65° to 67° C.

*Example 9*

Following the procedure of Example 8, p-dimethyl-amino-salicylaldehyde is obtained by hydrolizing 2-formyl-5-dimethylamino-benzenesulfonic acid with dilute sodium hydroxide solution. p-Dimethylamino-salicylaldehyde melts at 77° to 78° C.

We claim:
1. Process for preparing an aromatic hydroxy aldehyde which comprises heating 2-sulfonylbenzaldehyde in an aqueous alkaline medium for about 1 to 10 minutes at a temperature within the range of about 220 to 300° C., thereafter immediately cooling the reaction mixture and recovering the aromatic hydroxy aldehyde formed.

2. Process for preparing an aromatic hydroxy aldehyde which comprises heating 4-sulfonylbenzaldehyde in an aqueous alkaline medium for about 1 to 10 minutes at a temperature within the range of about 220 to 300° C., thereafter immediately cooling the reaction mixture and recovering the aromatic hydroxy aldehyde formed.

References Cited in the file of this patent

UNITED STATES PATENTS 1,321,271   Zollinger _____ Nov. 11, 1919

FOREIGN PATENTS 60,077   Germany _____ Nov. 28, 1891

OTHER REFERENCES

Mueller et al.: German printed application 12 707 IVB laid open to public Nov. 3, 1955 (4 pages) 260–600.